United States Patent
Yu

(10) Patent No.: US 11,702,078 B2
(45) Date of Patent: Jul. 18, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Kaijiang Yu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 140 days.

(21) Appl. No.: 17/197,096

(22) Filed: Mar. 10, 2021

(65) Prior Publication Data

US 2021/0284165 A1  Sep. 16, 2021

(30) Foreign Application Priority Data

Mar. 16, 2020  (JP) .................................. 2020-045677

(51) Int. Cl.
  *B60W 30/18*  (2012.01)
  *G06V 20/56*  (2022.01)
  *B60W 60/00*  (2020.01)

(52) U.S. Cl.
  CPC .... *B60W 30/18163* (2013.01); *B60W 60/001* (2020.02); *G06V 20/56* (2022.01); *B60W 2520/06* (2013.01); *B60W 2552/53* (2020.02)

(58) Field of Classification Search
  CPC ......... B60W 30/18163; B60W 60/001; B60W 2520/06; B60W 2552/53;
  (Continued)

(56) References Cited

U.S. PATENT DOCUMENTS

2020/0377117 A1* 12/2020 Nojiri ................. B60W 60/001
2021/0078575 A1*  3/2021 Machida ............... B60W 50/14
(Continued)

FOREIGN PATENT DOCUMENTS

JP  2007-288444  11/2007
JP  2007-323178  12/2007
(Continued)

OTHER PUBLICATIONS

Japanese Office Action for Japanese Patent Application No. 2020-045677 dated Feb. 1, 2022.

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle control device recognizes a second self-position, which is obtained by correcting a first self-position, and an orientation of a vehicle on a road, on which the vehicle is traveling, based on a situation around the vehicle, the first self-position, and map information, determines a steering control mode and a speed control mode of the vehicle based on the second self-position and the orientation of the vehicle, and performs automated driving by controlling the vehicle based on the determined control modes. When the vehicle is scheduled to advance from a first lane to a second lane and it is not possible to recognize a target associated with a road indicating an end point of a merging section, a determiner determines a steering angle control mode for searching for the target based on the second self-position and the orientation of the vehicle.

8 Claims, 13 Drawing Sheets

(58) Field of Classification Search
CPC .......... B60W 30/18145; B60W 40/02; B60W 40/06; G06V 20/56; G06V 20/588
See application file for complete search history.

(56) References Cited

U.S. PATENT DOCUMENTS

2021/0261162 A1* 8/2021 Hiramatsu ............. G08G 1/167
2021/0370989 A1* 12/2021 Morimura ............. B65G 61/00

FOREIGN PATENT DOCUMENTS

| JP | 2012-133446 | 7/2012 |
| JP | 2018-189463 | 11/2018 |
| JP | 2019-036050 | 3/2019 |

* cited by examiner

# VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-045677, filed Mar. 16, 2020, the content of which is incorporated herein by reference.

BACKGROUND

Field of the Invention

The present invention relates to a vehicle control device, a vehicle control method, and a storage medium.

Description of Related Art

In the related art, an on-vehicle camera controller, which controls an on-vehicle camera that photographs the surroundings of a vehicle by changing a photographing range by a zoom function, has been disclosed (for example, Japanese Unexamined Patent Application, First Publication No. 2007-288444). This on-vehicle camera controller controls a photographing viewing angle so as to photograph a determined photographing range based on vehicle position information and map information, or controls a photographing viewing angle based on information on a traveling state.

However, when an imager having a function of changing an imaging range or an imaging viewing angle is provided as in the above device, the cost may increase or the structure may become complicated.

SUMMARY

The present invention is achieved in view of the problems described above, and one object of the present invention is to provide a vehicle control device, a vehicle control method, and a storage medium, by which it is possible to more accurately recognize the surroundings of a vehicle with a simple configuration.

A vehicle control device, a vehicle control method, and a storage medium according to the invention employ the following configurations.

(1) A vehicle control device is a vehicle control device including a storage device configured to store a program; and a hardware processor, wherein the hardware processor executes the program stored in the storage device, thereby acquiring a first self-position at which a vehicle is present, recognizing a situation around the vehicle based on information provided by a detection device that detects the situation around the vehicle, recognizing a second self-position, which is obtained by correcting the first self-position, and an orientation of the vehicle on a road, on which the vehicle is traveling, based on the recognized situation around the vehicle, the acquired first self-position, and map information stored in the storage device, determining a steering control mode and a speed control mode of the vehicle based on the recognized second self-position and orientation of the vehicle, and performing automated driving by controlling the vehicle based on the determined control modes, when the vehicle is scheduled to advance from a first lane in which the vehicle is travelling to a second lane being a main lane in which the vehicle is scheduled to advance and the hardware processor has failed to recognize a target associated with a road indicating an end point of a merging section in which merging from the first lane to the second lane is allowed, the hardware processor determines a steering angle control mode for searching for the target based on the second self-position and the orientation of the vehicle.

(2) In the above aspect (1), the steering angle control mode for searching for the target is a control mode in which a reference direction of the vehicle is set to a first direction in which the target is estimated to be present, and the hardware processor estimates the direction, in which the target exists, based on at least the second self-position, the orientation of the vehicle, and the map information.

(3) In the above aspect (2), the first direction is a direction in which a relationship between the reference direction and a direction in which a road division line of the second lane extends is close to a parallel relationship.

(4) In the above aspect (2), the steering angle control mode for searching for the target is a control mode in which the reference direction of the vehicle is set to the first direction, in which the target is estimated to be present, and is returned to a second direction before being set to the first direction.

(5) In the above aspect (4), the relationship between the reference direction set to the first direction and the direction in which the road division line of the second lane extends is closer to an orthogonal relationship than the relationship between the reference direction set to the second direction and the direction in which the road division line of the second lane extends.

(6) In the above aspect (1), the detection device is an imager that images a stationary range in front of the vehicle.

(7) In the above aspect (1), the hardware processor acquires the first self-position, at which the vehicle is present, based on a positioning result of a positioning system using a satellite.

(8) In the above aspect (1), the situation around the vehicle recognized by the hardware processor includes an end of a buffer zone which is a start point of a merging area existing in front of the vehicle and a road division line of the that the vehicle is to enter, and the hardware processor recognizes the second self-position, which is obtained by correcting the first self-position, and the orientation of the vehicle on the road, on which the vehicle is traveling, based on the end of the buffer zone which is the start point of the merging area, the road division line of the main lane that the vehicle is to enter, the self-position acquired by the hardware processor, and the map information.

(9) In the above aspect (8), the target is an end of the buffer zone which is an end point of the merging area, and the hardware processor recognizes the merging area based on the start point and the end point of the merging area, determines the steering control mode and the speed control mode of the vehicle based on the merging area, the second self-position, and the orientation of the vehicle, and performs automated driving based on the determined control mode, thereby controlling the vehicle such that it enters the main lane in the merging area.

(10) A vehicle control method according to an aspect of the invention is a vehicle control method to be executed by a computer, including: acquiring a first self-position at which a vehicle is present; recognizing a situation around the vehicle based on information provided by a detection device that detects the situation around the vehicle; recognizing a second self-position, which is obtained by correcting the first self-position, and an orientation of the vehicle on a road, on which the vehicle is traveling, based on the recognized situation around the vehicle, the acquired first self-position, and map information stored in the storage device; determining a steering control mode and a speed control mode of the vehicle based on the recognized second self-position and orientation of the vehicle; performing automated driving by controlling the vehicle based on the determined control modes; and determining, when the vehicle is scheduled to advance from a first lane in which the vehicle is travelling to a second lane being a main lane in which the vehicle is scheduled to advance and it is not possible to recognize a target associated with a road indicating an end point of a merging section in which merging from the first lane to the second lane is allowed, a steering angle control mode for searching for the target based on the second self-position and the orientation of the vehicle.

(11) A non-transitory computer readable storage medium according to an aspect of the invention is a storage medium having stored thereon a program for causing a computer to: acquire a first self-position at which a vehicle is present; recognize a situation around the vehicle based on information provided by a detection device that detects the situation around the vehicle; recognize a second self-position, which is obtained by correcting the first self-position, and an orientation of the vehicle on a road, on which the vehicle is traveling, based on the recognized situation around the vehicle, the acquired first self-position, and map information stored in the storage device; determine a steering control mode and a speed control mode of the vehicle based on the recognized second self-position and orientation of the vehicle; perform automated driving by controlling the vehicle based on the determined control modes; and determine, when the vehicle is scheduled to advance from a first lane in which the vehicle is travelling to a second lane being a main lane in which the vehicle is scheduled to advance and it is not possible to recognize a target associated with a road indicating an end point of a merging section in which merging from the first lane to the second lane is allowed, a steering angle control mode for searching for the target based on the second self-position and the orientation of the vehicle.

According to (1) to (11), the vehicle control device controls the vehicle to perform automated driving based on the steering angle control mode for searching for the target, which is determined based on the second self-position and the orientation of the vehicle, thereby more accurately recognizing the surroundings of the vehicle with a simple configuration.

DESCRIPTION OF EMBODIMENTS

Hereinafter, an embodiment of a vehicle control device, a vehicle control method, and a storage medium of the present invention will be described with reference to the drawings.

[Overall Configuration]

Figure 1:
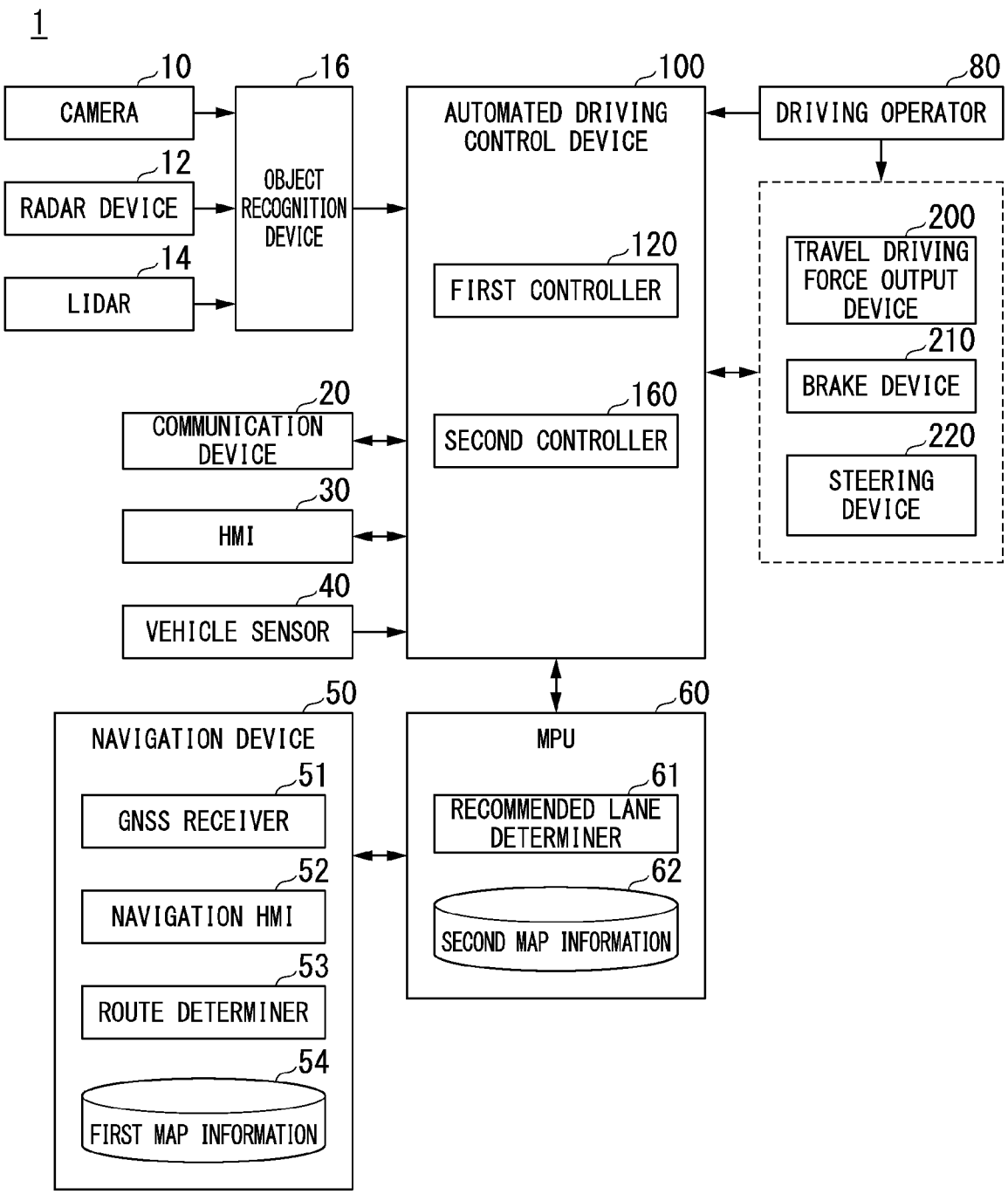
FIG. 1 is a configuration diagram of a vehicle system using a vehicle control device according to an embodiment.

FIG. 1 is a configuration diagram of a vehicle system 1 using a vehicle control device according to an embodiment. A vehicle, in which the vehicle system 1 is installed, is a vehicle with two wheels, three wheels, four wheels and the like, for example, and its driving source is an internal combustion engine such as a diesel engine and a gasoline engine, an electric motor, or a combination thereof. The electric motor operates by using power generated by a generator connected to the internal combustion engine or power discharged from a secondary cell or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices and equipment are connected to one another via a multiplex communication line such as a controller area network (CAN) communication line, a serial communication line, a wireless communication network, and the like. Note that the configuration shown in FIG. 1 is merely an example and a part of the configuration may be omitted, or other configurations may be added.

The camera 10 is, for example, a digital camera using a solid-state imaging element such as a charge coupled device (CCD) and a complementary metal oxide semiconductor (CMOS). The camera 10 is mounted at arbitrary places on the vehicle (hereinafter, referred to as a vehicle M) in which the vehicle system 1 is installed. In the case of capturing an image of an area in front of the vehicle M, the camera 10 is mounted on an upper part of a front windshield, on a rear surface of a rear-view mirror, and the like. The camera 10, for example, periodically and repeatedly captures the surroundings of the vehicle M. The camera 10 may be a stereo camera.

The radar device 12 emits radio waves such as millimeter waves to the surroundings of the vehicle M, detects radio waves (reflected waves) reflected by an object, and detects at least a position (a distance and an orientation) of the object. The radar device 12 is mounted at arbitrary places on the vehicle M. The radar device 12 may detect the position and the speed of the object by a frequency modulated continuous wave (FM-CW) scheme.

The LIDAR 14 emits light (or electromagnetic waves having a wavelength close to that of light) to the surroundings of the vehicle M and measures scattered light. The LIDAR 14 detects a distance to a target based on a time from light emission to light reception. The emitted light is a pulsed laser beam, for example. The LIDAR 14 is mounted at arbitrary places on the vehicle M.

The object recognition device 16 performs a sensor fusion process on results of detection by some or all of the camera 10, the radar device 12, and the LIDAR 14, thereby recognizing the position, the type, the speed and the like of an object. The object recognition device 16 outputs a recognition result to the automated driving control device 100. The object recognition device 16 may output the detection results of the camera 10, the radar device 12, and the LIDAR 14 to the automated driving control device 100 as is. The object recognition device 16 may be omitted from the vehicle system 1.

The communication device 20 communicates with other vehicles present around the vehicle M, or communicates with various server devices via a wireless base station by using, for example, a cellular network, a Wi-Fi network, Bluetooth (registered trademark), dedicated short range communication (DSRC) and the like.

The HMI 30 presents various types of information to an occupant of the vehicle M and receives an input operation of the occupant. The HMI 30 includes various display devices, speakers, buzzers, touch panels, switches, keys, and the like.

The vehicle sensor 40 includes a vehicle speed sensor that detects the speed of the vehicle M, an acceleration sensor that detects acceleration, a yaw rate sensor that detects an angular velocity around a vertical axis, a direction sensor that detects the orientation of the vehicle M, and the like.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) and a flash memory. The GNSS receiver 51 specifies the position of the vehicle M based on a signal received from a GNSS satellite. The position of the vehicle M may be specified or complemented by an inertial navigation system (INS) using the output of the vehicle sensor 40. The navigation HMI 52 includes a display device, a speaker, a touch panel, keys and the like. The navigation HMI 52 may be partially or entirely shared with the aforementioned HMI 30. The route determiner 53 determines, for example, a route (hereinafter, referred to as a route on a map) to a destination, which is input by an occupant using the navigation HMI 52, from the position of the vehicle M specified by the GNSS receiver 51 (or any input position) with reference to the first map information 54. The first map information 54 is, for example, information in which a road shape is expressed by links indicating a road and nodes connected by the links. The first map information 54 may include a road curvature, point of interest (POI) information, and the like. The route on the map is output to the MPU 60. The navigation device 50 may provide route guidance using the navigation HMI 52 based on the route on the map. The navigation device 50 may be implemented by, for example, functions of a terminal device such as a smart phone and a tablet terminal owned by an occupant. The navigation device 50 may transmit the current position and the destination to a navigation server via the communication device 20, and acquire a route equivalent to the route on the map from the navigation server.

The MPU 60 includes, for example, a recommended lane determiner 61 and stores second map information 62 in a storage device such as an HDD and a flash memory. The recommended lane determiner 61 divides the route on the map provided from the navigation device 50 into a plurality of blocks (for example, divides the route on the map every 100 m in the vehicle travel direction), and determines a recommended lane for each block with reference to the second map information 62. The recommended lane determiner 61 determines which lane to travel from the left. When there is a branch point on the route on the map, the recommended lane determiner 61 determines a recommended lane such that the vehicle M can travel on a reasonable route for traveling to a branch destination.

The second map information 62 is more accurate map information than the first map information 54. The second map information 62 includes, for example, information on the center of a lane, information on the boundary of the lane, and the like. Furthermore, the second map information 62 may include road information, traffic regulation information, address information (address and postal code), facility information, telephone number information, and the like. The second map information 62 may be updated at any time by the communication device 20 communicating with another device. The second map information 62 stores information indicating the position and range of a zebra zone (buffer zone). The zebra zone is a road marking for guiding the traveling of a vehicle. The zebra zone is, for example, a marking represented by a striped pattern.

The driving operator 80 includes, for example, an accelerator pedal, a brake pedal, a shift lever, steering wheel, a deformed steer, a joy stick, and other operators. The driving operator 80 is provided with a sensor for detecting an operation amount or the presence or absence of an operation, and its detection result is output to the automated driving control device 100, or some or all of the travel driving force output device 200, the brake device 210, and the steering device 220.

The automated driving control device 100 includes, for example, a first controller 120 and a second controller 160. Each of the first controller 120 and the second controller 160 is implemented by, for example, a hardware processor such as a central processing unit (CPU) that executes a program (software). Some or all of these components may be implemented by hardware (a circuit unit: including circuitry) such as a large scale integration (LSI), an application specific integrated circuit (ASIC), a field-programmable gate array (FPGA), and a graphics processing unit (GPU), or may be implemented by software and hardware in cooperation. The program may be stored in advance in a storage device (storage device including a non-transitory storage medium) such as an HDD and a flash memory of the automated driving control device 100, or may be installed in the HDD and the flash memory of the automated driving control device 100 when a detachable storage medium (non-transitory storage medium) storing the program, such as a DVD and a CD-ROM, is mounted on a drive device. The automated driving control device 100 is an example of a "vehicle control device".

Figure 2:
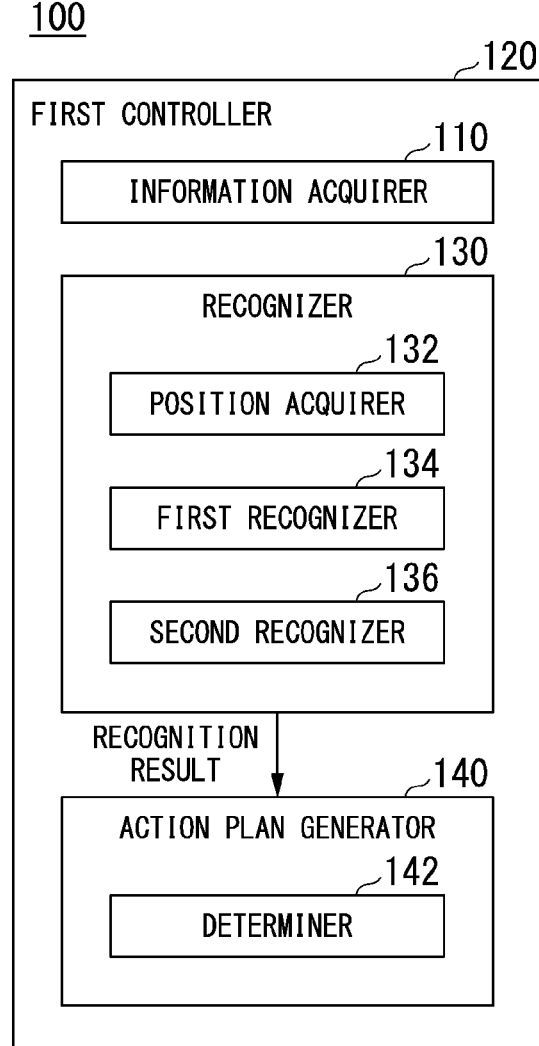
FIG. 2 is a functional configuration diagram of a first controller and a second controller.
Figure 2:
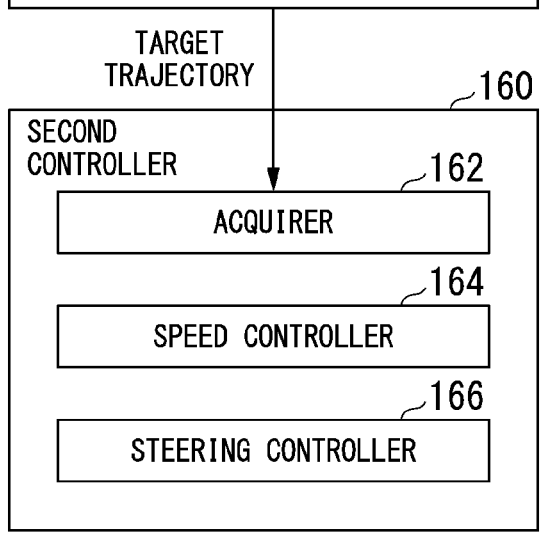

FIG. 2 is a functional configuration diagram of the first controller 120 and the second controller 160. The first controller 120 includes, for example, an information acquirer 110, a recognizer 130, and an action plan generator 140. The first controller 120 performs, for example, a function based on an artificial intelligence (AI) and a function based on a predetermined model in parallel. For example, a function of "recognizing an intersection" may be implemented by performing intersection recognition by deep learning and the like and recognition based on a predetermined condition (pattern matching signals, road markings, and the like) in parallel, or scoring both recognition and comprehensively evaluating them. In this way, the reliability of automated driving is ensured.

The information acquirer 110 acquires map information in the vicinity of an area where the vehicle M travels. The information acquirer 110 acquires, for example, information of the first map information 54 or information of the second map information 62.

The recognizer 130 recognizes a state such as the position, speed, acceleration and the like of an object around the vehicle M based on information input from the camera 10, the radar device 12, and the LIDAR 14 via the object recognition device 16. The position of the object is recognized as, for example, a position on absolute coordinates with a representative point (center of gravity, the center of the drive axis, and the like) of the vehicle M as the origin, and is used for control. The position of the object may be represented by a representative point of the center of gravity, a corner, and the like of the object, or may be represented by an indicated area. The "state" of the object may include an acceleration, a jerk, or an "action state" (for example, whether a lane change is being performed or is intended to be performed) of the object.

The recognizer 130 recognizes, for example, a lane (a travel lane) in which the vehicle M is traveling. For example, the recognizer 130 compares a pattern (for example, an arrangement of solid lines and broken lines) of road division lines obtained from the second map information 62 with a pattern of road division lines around the vehicle M, which is recognized from the image captured by the camera 10, thereby recognizing the travel lane. Note that the recognizer 130 may recognize the travel lane by recognizing not only the road division lines but also a traveling road boundary (road boundary) including the road division lines, a road shoulder, a curb, a median strip, a guardrail, and the like. In this recognition, the position of the vehicle M acquired from the navigation device 50 or a processing result of the INS may be taken into consideration. The recognizer 130 recognizes a temporary stop line, an obstacle, a red light, a tollgate, and other road events.

When recognizing the travel lane, the recognizer 130 recognizes the position and the orientation of the vehicle M with respect to the travel lane. The recognizer 130, for example, may recognize, as the relative position and the orientation of the vehicle M with respect to the travel lane, a deviation of a reference point of the vehicle M from a center of a lane and an angle formed with respect to a line connecting the center of the lane in the traveling direction of the vehicle M. Instead of this, the recognizer 130 may recognize the position and the like of the reference point of the vehicle M with respect to any one of the side ends (the road division line or the road boundary) of the travel lane as the relative position of the vehicle M with respect to the travel lane.

The recognizer 130 includes, for example, a position acquirer 132, a first recognizer 134, and a second recognizer 136. The position acquirer 132 acquires a first self-position at which the vehicle is present. The first self-position is, for example, a position based on a positioning result of a positioning system using a satellite. The first self-position is, for example, the position of the vehicle M identified by the GNSS receiver 51 or provided by the navigation device 50.

The first recognizer 134 recognizes the situation around the vehicle M based on information provided by the object recognition device 16 (information provided by a detection device that detects the situation around the vehicle M). The camera 10, the radar device 12, or the LIDAR 14 is an example of the "detection device". The detection device detects (or images) a stationary range in front of the vehicle M, for example, without expanding or contracting a detection range.

The second recognizer 136 recognizes a second self-position, which is obtained by correcting the first self-position, and the orientation of the vehicle M on a road, on which the vehicle M is traveling, based on the situation around the vehicle M recognized by the first recognizer 134, the first self-position acquired by the position acquirer 132, and the map information acquired by the information acquirer 110 (map information stored in the storage device). Details of this process will be described below (see FIG. 8 to FIG. 11 to be described below).

The action plan generator 140 generates a target trajectory along which the vehicle M will travel in the future automatically (independent of a driver's operation) so as to be able to travel in the recommended lane determined by the recommended lane determiner 61 in principle and further to cope with surrounding situations of the vehicle M. The target trajectory includes a speed element, for example. For example, the target trajectory is represented as a sequence of points (trajectory points) to be reached by the vehicle M. The trajectory point is a point that the vehicle M is to reach every predetermined travel distance (for example, about several meters) as a road distance, and a target speed and a target acceleration at every predetermined sampling time (for example, about several tenths of a [sec]) are separately generated as a part of the target trajectory. Furthermore, the trajectory point may be a position that the vehicle M is to reach at the sampling time for each predetermined sampling time. In such a case, information on the target speed and the target acceleration is represented by the interval between the trajectory points.

When generating the target trajectory, the action plan generator 140 may set events for automated driving. The events for automated driving include constant speed travel events, low speed travel events, lane change events, branch events, merge events, takeover events, and the like. The action plan generator 140 generates the target trajectory according to an activated event.

The action plan generator 140 has, for example, a determiner 142. The determiner 142 determines a steering control mode and a speed (or acceleration) control mode of the vehicle M based on the second self-position and the orientation of the vehicle M recognized by the second recognizer 136. The control mode is control policy or plan and includes the degree of control such as a control amount per unit time. The steering control mode is, for example, a steering direction and a steering control amount, and the speed control mode is, for example, the degree of a change in the speed. Details of the process of the determiner 142 will be described below.

The second controller 160 controls the vehicle M in the steering control mode and the speed control mode determined by the determiner 142. The second controller 160 controls the travel driving force output device 200, the brake device 210, and the steering device 220 such that the vehicle M passes through the target trajectory generated by the action plan generator 140 at scheduled times. The action plan generator 140, the second controller 160, or a combination of the action plan generator 140 and the second controller 160 is an example of a "controller".

Returning to FIG. 2, the second controller 160 includes, for example, an acquirer 162, a speed controller 164, and a steering controller 166. The acquirer 162 acquires information on the target trajectory (trajectory points) generated by the action plan generator 140 and stores the information in a memory (not shown). The speed controller 164 controls the travel driving force output device 200 or the brake device 210 based on a speed element associated with the target trajectory stored in the memory. The steering controller 166 controls the steering device 220 according to the degree of bending of the target trajectory stored in the memory. The processes of the speed controller 164 and the steering controller 166 are implemented by, for example, a combination of feedforward control and feedback control. As an example, the steering controller 166 performs a combination of feedforward control according to the curvature of a road in front of the vehicle M and feedback control based on a deviation from the target trajectory.

The travel driving force output device 200 outputs a travel driving force (torque) for driving the vehicle to driving wheels. The travel driving force output device 200 includes, for example, a combination of an internal combustion engine, an electric motor, a transmission and the like, and an electronic controller (ECU) for controlling them. The ECU controls the aforementioned configuration according to information input from the second controller 160 or information input from the driving operator 80.

The brake device 210 includes, for example, a brake caliper, a cylinder for transferring hydraulic pressure to the brake caliper, an electric motor for generating the hydraulic pressure in the cylinder, and a brake ECU. The brake ECU controls the electric motor according to the information input from the second controller 160 or the information input from the driving operator 80, thereby allowing a brake torque corresponding to a brake operation to be output to each wheel. The brake device 210 may have a backup mechanism for transferring the hydraulic pressure generated by an operation of the brake pedal included in the driving operator 80 to the cylinder via a master cylinder. Not that the brake device 210 is not limited to the aforementioned configuration and may be an electronically controlled hydraulic pressure brake device that controls an actuator according to the information input from the second controller 160, thereby transferring the hydraulic pressure of the master cylinder to the cylinder.

The steering device 220 includes, for example, a steering ECU and an electric motor. The electric motor, for example, changes an orientation of a steering wheel by allowing a force to act on a rack and pinion mechanism. The steering ECU drives the electric motor according to the information input from the second controller 160 or the information input from the driving operator 80, thereby changing the orientation of the steering wheel.

[Process Related to Merging (Part 1)]

When the vehicle M is scheduled to advance from a first lane in which the vehicle M is travelling to a second lane being a main lane in which the vehicle M is scheduled to advance and the first recognizer 134 has failed to recognize a target associated with a road indicating an end point of a merging section in which merging from the first lane to the second lane is allowed, the automated driving control device 100 (determiner 142) determines a steering angle control mode for searching for the target based on the second self-position and the orientation of the vehicle M. Then, the automated driving control device 100 controls the vehicle M based on the determined control mode. Hereinafter, this process will be described.

In the present embodiment, an example, in which the vehicle M changes lanes to a right lane with respect to the traveling direction of the vehicle M and merges into the right lane, will be described, but a process is performed based on the same concept also when the vehicle M changes lanes to a left lane and merges into the left lane. In such a case, the right direction or the left direction is read as the other direction and a plus direction or a minus direction is read as the other direction as appropriate.

In the following example, the vehicle M and the road will be described using a bird's-eye view, but the automated driving control device 100 actually recognizes the surrounding situation and the like in the forward direction of the vehicle M and performs control based on the recognition result.

Figure 3:
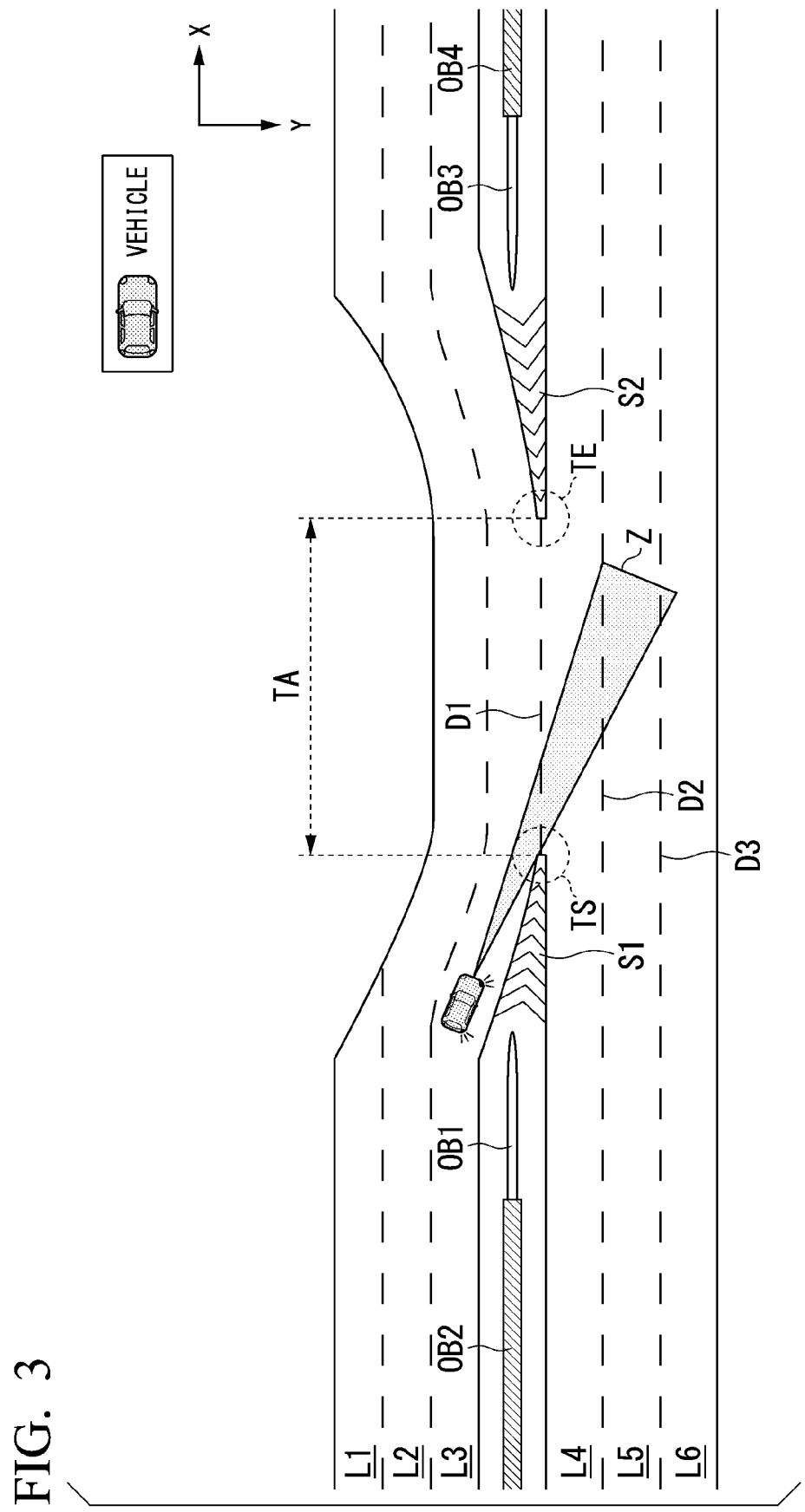
FIG. 3 is a diagram (part 1) for explaining a process when a vehicle merges into a main lane.

FIG. 3 is a diagram (part 1) for explaining a process when the vehicle M merges into a main lane. In the following description, a vehicle traveling direction (road extension direction) may be referred to as an X direction and a vehicle width direction (road width direction) may be referred to as a Y direction. FIG. 3 shows a road including lanes L1 to L6. The lanes L1 to L3 may be referred to as merging lanes (first lanes) and the lanes L4 to L6 may be referred to as main lanes (second lanes).

An area where the lane L3 (first lane) and the lane L4 (second lane) are connected is a target area TA where the vehicle M can merge into the main lane. The vehicle M can change lanes from the lane L3 to the lane L4 in the target area TA. A zebra zone S1, a branch zone OB1, and a branch zone OB2 are provided on the minus X direction side of the target area TA (side opposite to the traveling direction of the vehicle M). A zebra zone S2, a branch zone OB3, and a branch zone OB4 are provided on the plus X direction side of the target area TA. The target area TA is a section between an end TS of the zebra zone S1 on the plus X direction side and an end TE of the zebra zone S2 on the minus X direction side. The zebra zone is an example of a "buffer zone".

In FIG. 3, an area Z is an area where the vehicle M (for example, the first recognizer 134) can recognize road markings (for example, a zebra zone). In other words, the area Z is an area where the first recognizer 134 can recognize the road marking based on the information provided by the object recognition device 16, the image captured by the camera 10, the detection results of the radar device 12, or the detection results of the LIDAR 14. The area Z is, for example, an area in the range of about several hundreds of meters (for example, about 150 m to about 250 m) in front of the vehicle M. Furthermore, the area Z is a fan-shaped area starting from the vehicle M.

As shown in FIG. 3, when the automated driving control device 100 travels in the lane L3 and plans to change lanes to the lane L4, the automated driving control device 100 recognizes the end TS of the zebra zone and the end TE of the zebra zone, and recognizes the target area TA based on the recognition result. Then, the automated driving control device 100 generates a plan for entering the lane L4 from the lane L3 in the target area TA, and allows the vehicle M to enter the lane L4 from the lane L3 based on the generated plan.

As shown in FIG. 3, when the road in the lane L3 has a curved shape, the vehicle M may face the plus Y direction side from the end TE of the zebra zone S2. In such a case, the vehicle M may not recognize the end TE of the zebra zone S2. In the example of FIG. 3, the curved shape is a shape in which the road in the lane L3 is formed to be recessed in the target area TA. The road in the lane L3 is inclined in the plus Y direction from the minus Y direction side toward the end TS in a predetermined section of the target area TA in the minus X direction, and is inclined in the plus Y direction from the minus Y direction side toward the end TE in a predetermined section of the target area TA in the plus X direction.

In the present embodiment, when the vehicle M has failed to recognize the end TE of the zebra zone S2 as described above, the determiner 142 determines the steering angle control mode for searching for the end TE (target) of the zebra zone S2 based on the recognition result of the second recognizer 136 (the second self-position and the orientation of the vehicle M). Then, the automated driving control device 100 controls the steering based on the determined steering angle control mode. The process of searching for the end TE of the zebra zone S2 will be described below (see FIG. 8 to FIG. 11).

Figure 4:
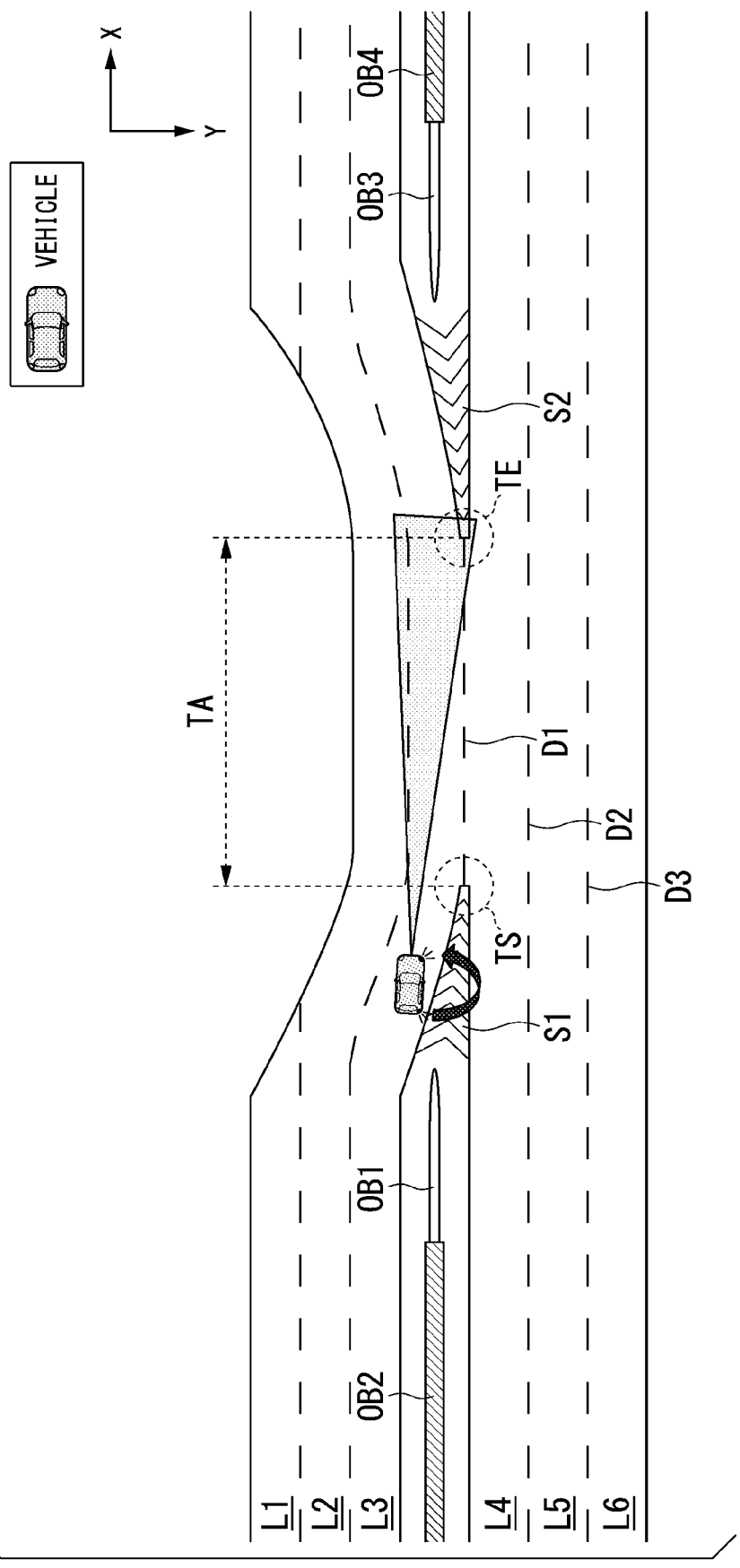
FIG. 4 is a diagram showing an example of the state of a vehicle after steering is controlled.

FIG. 4 is a diagram showing an example of the state of the vehicle M after the steering is controlled. For example, the orientation of the vehicle M is changed to a first direction. The first direction is a direction in which the reference direction of the vehicle M (for example, the direction of the central axis of the vehicle M) is parallel to a direction in which a road division line (or a road division line of a main lane) of the target area TA extends. As a consequence, the end TE of the zebra zone S2 is included in the area Z and the first recognizer 134 can recognize the end TE of the zebra zone S2.

For example, the automated driving control device 100 allows the reference direction of the vehicle M to be directed in the first direction, returns the reference direction to a second direction (for example, the orientation shown in FIG. 3) before being set to the first direction, and then enters the lane L4 from the lane L3 in the target area TA. The relationship between the reference direction set to the first direction and the direction in which the road division line of the main lane extends is closer to an orthogonal relationship than the relationship between the reference direction set to the second direction and the direction in which the road division line of the main lane extends.

As described above, the automated driving control device 100 can recognize the end TE of the zebra zone S2 and then recognize the target area TA, thereby smoothly entering the lane L4 from the lane L3 in the recognized target area TA.

[Process Related to Merging (Part 2)]

In the aforementioned example, it has been described that the vehicle M is travelling in the lane L3; however, even when the vehicle M is travelling in the lane L2, the same process as described above may be performed.

Figure 5:
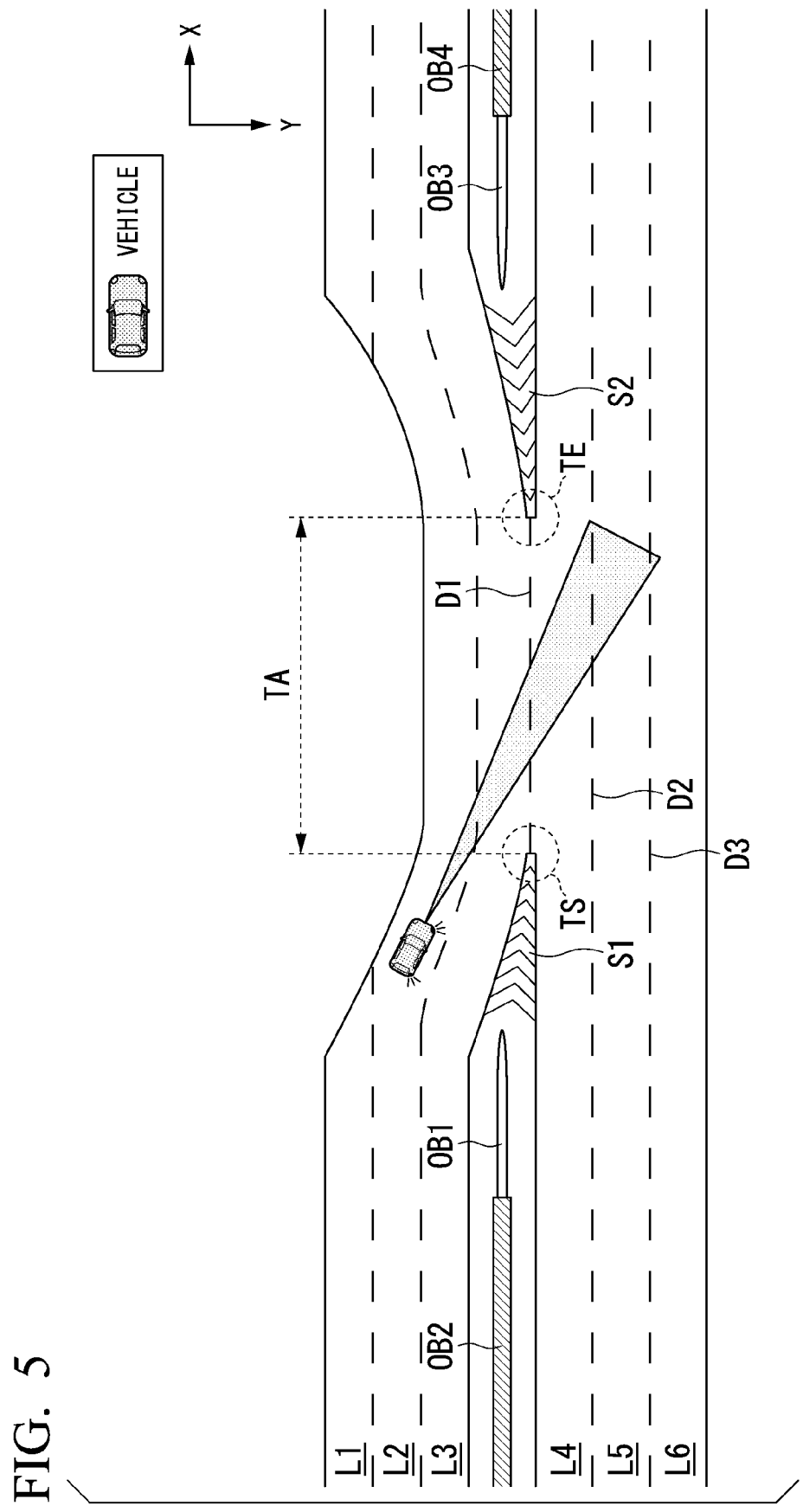
FIG. 5 is a diagram (part 2) for explaining a process when a vehicle merges into a main lane.

FIG. 5 is a diagram (part 2) for explaining a process when the vehicle M merges into the main lane. As shown in FIG. 5, the road in the lane L2 also has a curved shape like the lane L3. Therefore, since the vehicle M has failed to recognize the end TE of the zebra zone S2, the determiner 142 determines the steering angle control mode for searching for the end TE of the zebra zone S2 based on the recognition result of the second recognizer 136 (the second self-position and the orientation of the vehicle M). Then, the automated driving control device 100 controls steering based on the determined steering angle control mode.

Figure 6:
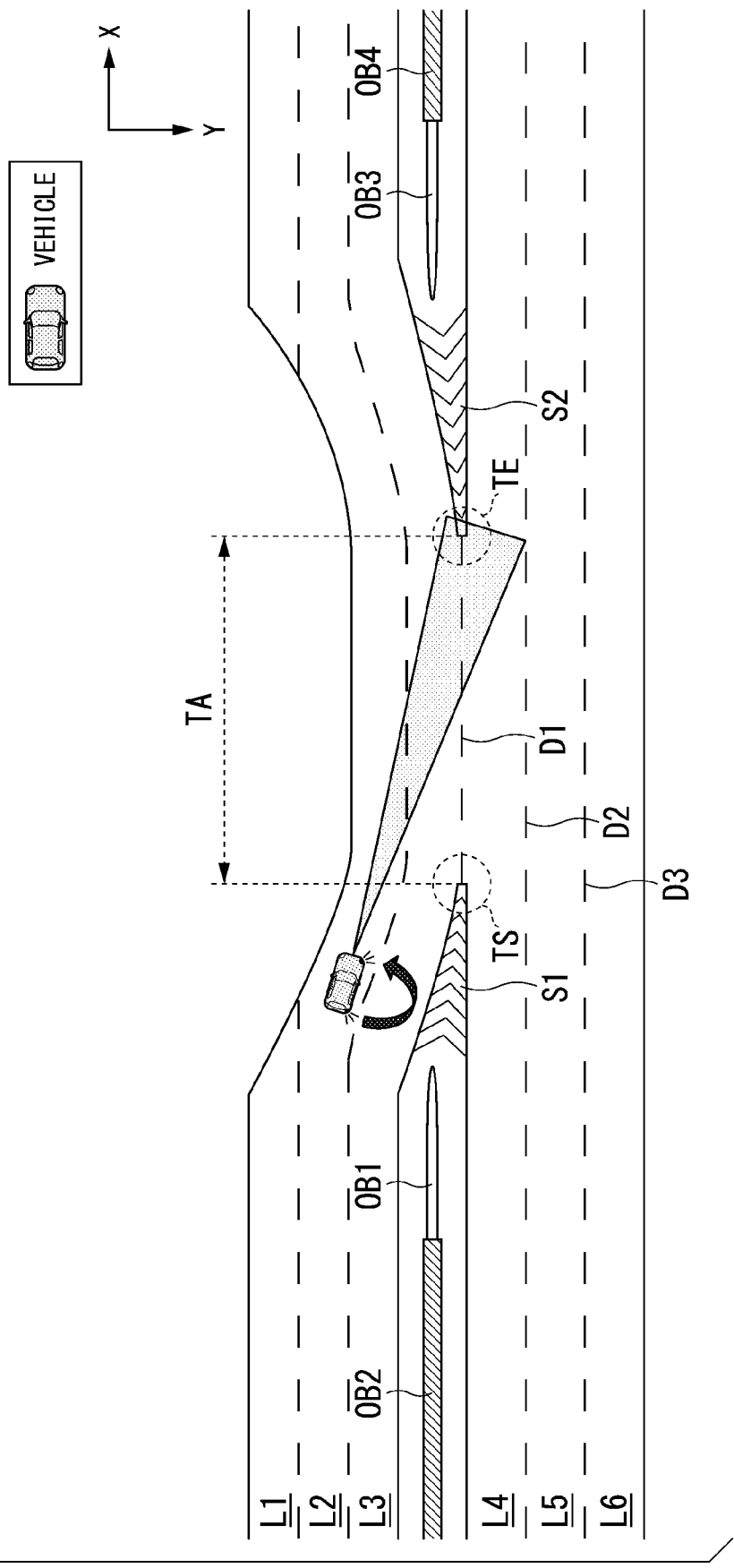
FIG. 6 is a diagram showing an example of the state of a vehicle after steering is controlled.

FIG. 6 is a diagram showing an example of the state of the vehicle M after steering is controlled. For example, the vehicle M changes its own orientation to the first direction as described above. As a consequence, the end TE of the zebra zone S2 is included in the area Z and the first recognizer 134 can recognize the end TE of the zebra zone S2.

Figure 7:
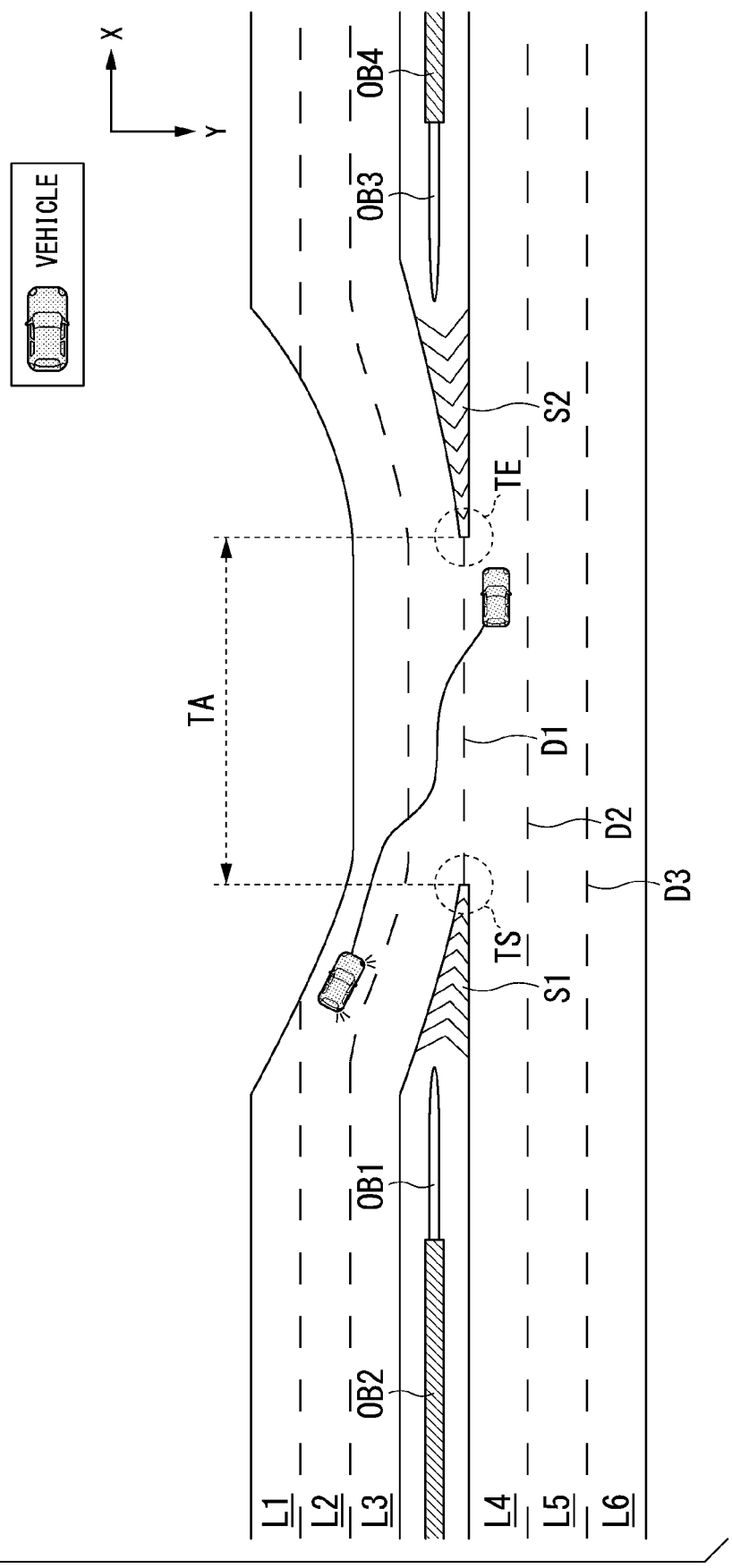
FIG. 7 is a diagram showing an example of a situation in which a vehicle smoothly enters a lane from a lane in a target area.

As described above, the automated driving control device 100 can recognize the end TE of the zebra zone S2 and then recognize the target area TA as shown in FIG. 7, thereby smoothly entering the lane L4 from the lane L3 in the recognized target area TA.

[Details of Process]

Figure 8:
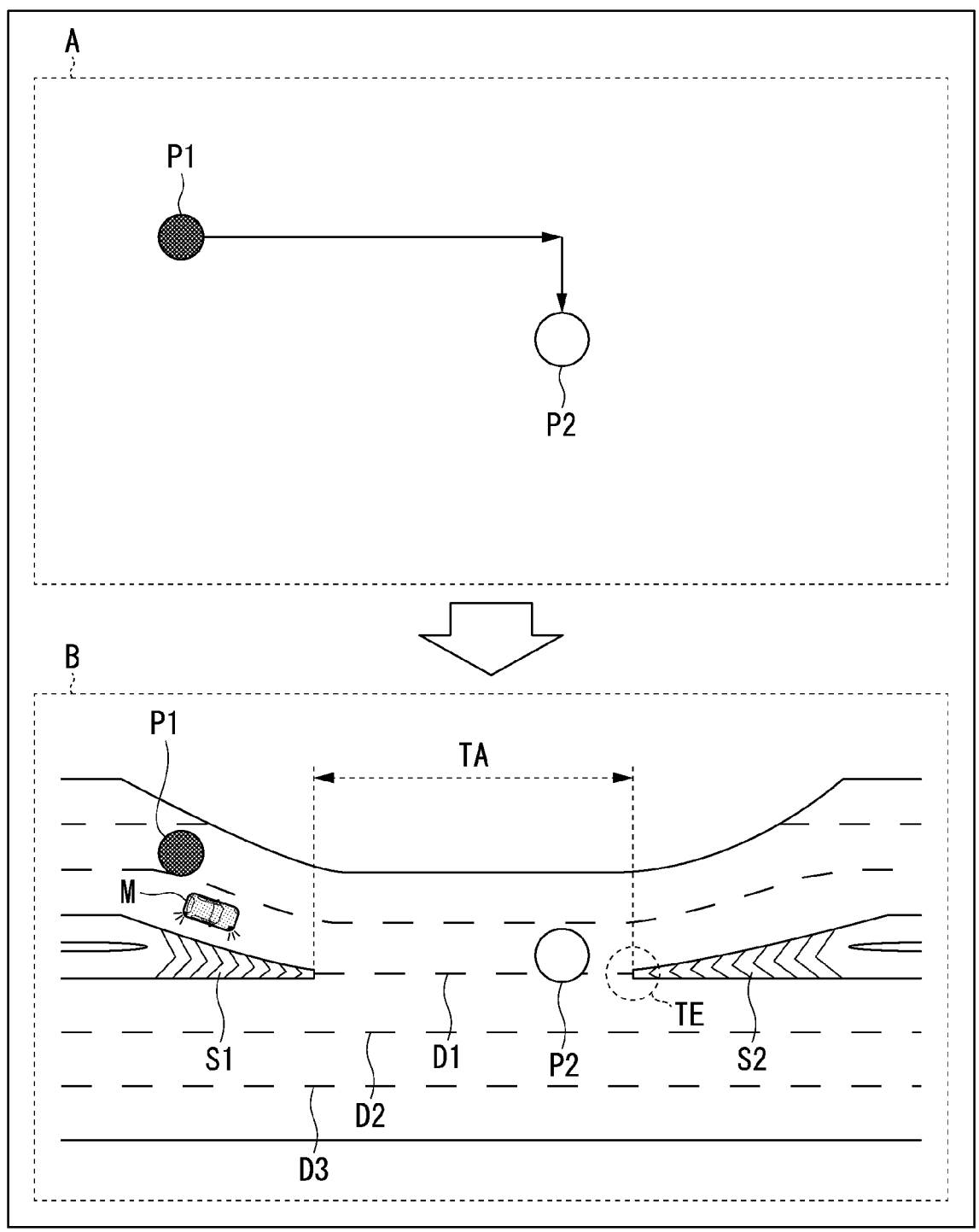
FIG. 8 is a diagram for explaining a process in which an automated driving control device recognizes the position of a vehicle and then searches for an end of a zebra zone.

FIG. 8 is a diagram for explaining a process in which the automated driving control device 100 recognizes the position of the vehicle M and then searches for the end TE of the zebra zone S2. As shown in A of FIG. 8, the position acquirer 132 acquires a position P1 of the vehicle M based on information (positioning result) provided by the navigation device 50.

For example, when the automated driving control device 100 estimates a position P2 of the end TE based on the aforementioned position P1 and position information of the end TE of the zebra zone S2 in the map information, the position P2 may deviate from an actual position of the end TE as shown in B of FIG. 8. This is because the position P1 may deviate from an actual position of the vehicle M due to an error and the like in the positioning result.

Therefore, in the present embodiment, the second recognizer 136 recognizes the second self-position, which is obtained by correcting the position P1 (first self-position), and the orientation of the vehicle M on a road, on which the vehicle M is traveling, based on the surrounding situation recognized by the first recognizer 134, the self-position acquired by the position acquirer 132, and the map information acquired by the information acquirer 110. Hereinafter, this process may be referred to as a correction process.

(Process of Recognizing Position of Vehicle)

Figure 9:
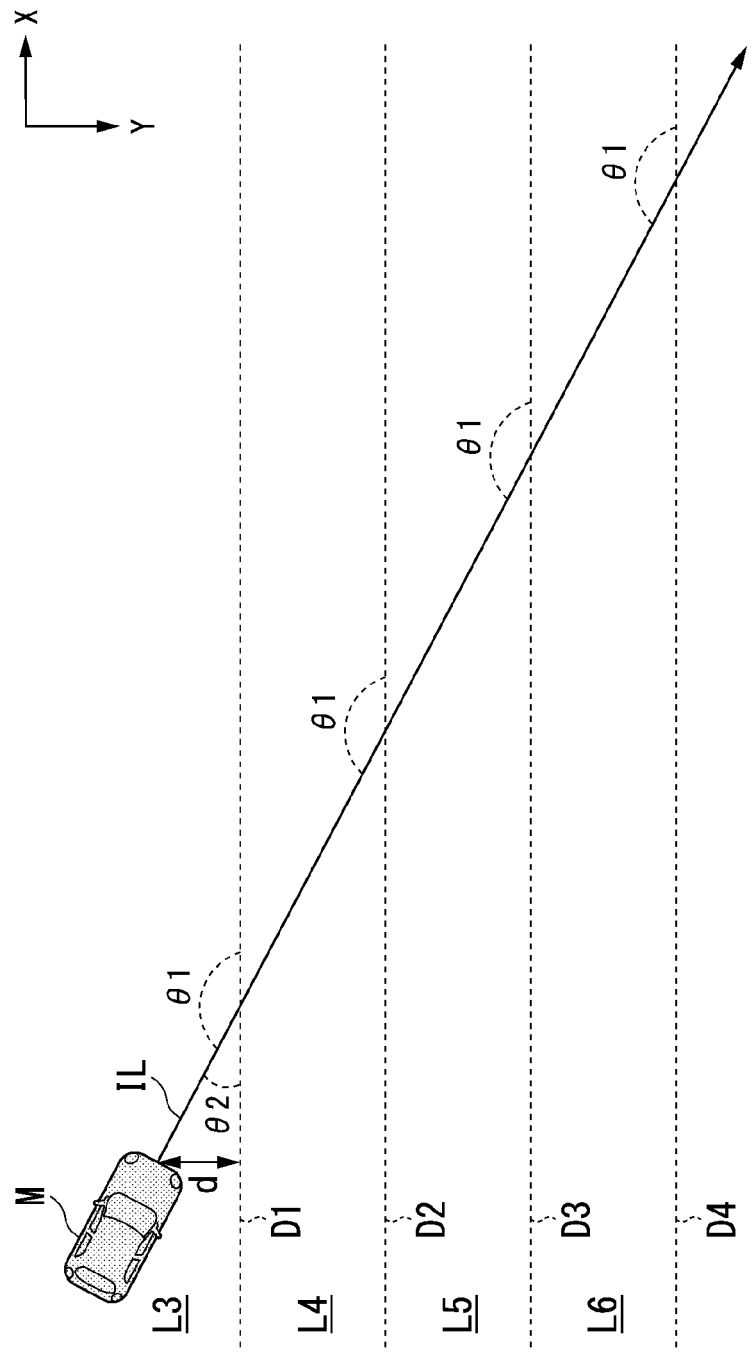
FIG. 9 is a diagram for explaining a correction process.

FIG. 9 is a diagram for explaining the correction process. The first recognizer 134 recognizes the end TS (omitted in FIG. 9) of the zebra zone S1 and division lines D1 to D4 that divide the lanes L4 to L6. The second recognizer 136 assumes a virtual line IL extending in the reference direction of the vehicle M. The second recognizer 136 recognizes the road division lines D1 to D4 that intersect the assumed virtual line IL. The second recognizer 136 recognizes the number of lanes based on the number of the recognized road division lines. For example, the number of lanes is obtained by subtracting 1 from the number of the road division lines.

The second recognizer 136 may recognize the number of lanes with reference to the map information. For example, when the difference between the estimated number of lanes and the recognized number of lanes is equal to or more than a predetermined number with reference to the map information based on the position of the vehicle M (for example, the position P1 which is the positioning result), the second recognizer 136 may acquire the road division line again and perform the process.

Moreover, the second recognizer 136 recognizes a distance d from the reference position of the vehicle M to the road division line D1. The road division line D1 is a road division line closest to the vehicle M. When the distance d is equal to or more than a threshold value, the second recognizer 136 may acquire the road division line again and perform the process because there is a possibility that the road division line is not be accurately recognized. The distance d may be directly derived based on the detection result of the detection device, or may be derived by calculation using the distance of the virtual line IL from the reference position of the vehicle M to the road division line D1 and an angle θ to be described below.

By the aforementioned process, the second recognizer 136 recognizes that the lanes L4 to L6 exist in the plus Y direction of the vehicle M and the vehicle M is traveling in the lane L3 adjacent to the minus Y direction side of the lane L4. Furthermore, when it is possible to recognize the position of the zebra zone S1 and the end TS thereof, the second recognizer 136 can recognize the position of the vehicle M in the X direction of the road in addition to the position of the vehicle M in the Y direction of the road.

(Process of Recognizing Orientation of Vehicle)

The second recognizer 136 recognizes intersections of the assumed virtual line IL and the respective road division lines D1 to D4, and derives angles formed by the virtual line IL and the respective road division lines D1 to D4 (angles formed by the virtual line IL and predetermined road division lines among the road division lines D1 to D4) at the intersections. The second recognizer 136 recognizes an angle θ1 formed by the aforementioned process. Then, the second recognizer 136 recognizes that the reference direction of the vehicle M is rotated by θ2 with respect to the road division line.

By the aforementioned process, the second recognizer 136 can recognize the orientation of the vehicle M with respect to the road division line.

Note that the second recognizer 136 may recognize the orientation of the vehicle M with respect to the road marking based on the road marking and the map information in place of (or in addition to) the road division line. The map information stores, for example, position coordinates indicating an area where the zebra zone is displayed, position coordinates of the lane, and the like. The second recognizer 136 can recognize the orientation of the vehicle M with respect to the lane of the road by applying the orientation of the vehicle M with respect to an actually recognized zebra zone to the orientation of the map information with respect to the zebra zone.

(Process of Determining Steering Mode of Steering)

As described above, the determiner 142 determines an operation control mode with reference to the recognized position and orientation of the vehicle M. The determiner 142 estimates the direction, in which the end TE exists, based on at least the second self-position, the orientation of the vehicle M, and the map information, and determines a control mode, in which the reference direction of the vehicle M is set to the first direction in which the end TE is estimated to be present, based on the estimation result.

Figure 10:
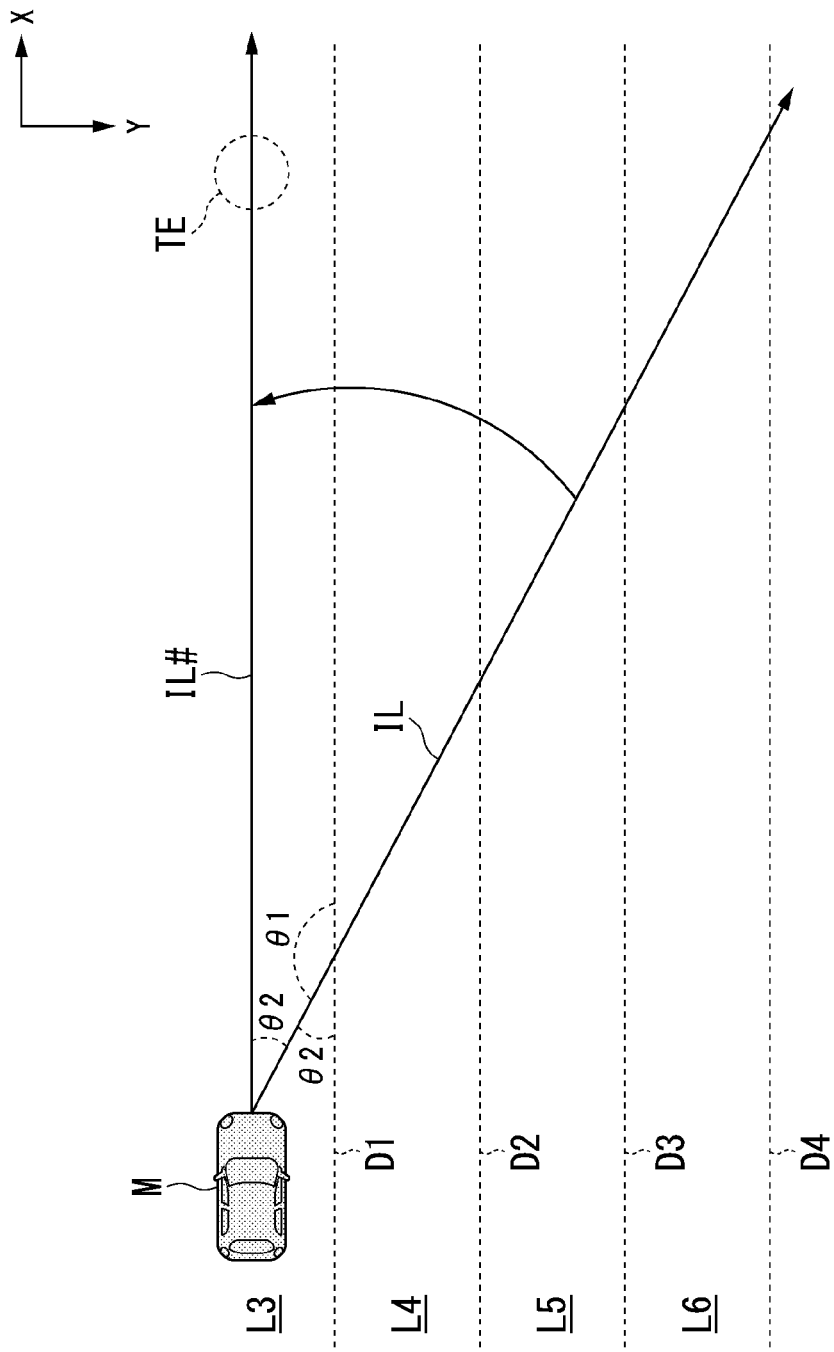
FIG. 10 is a diagram for explaining a process of determining a control mode.
Figure 11:
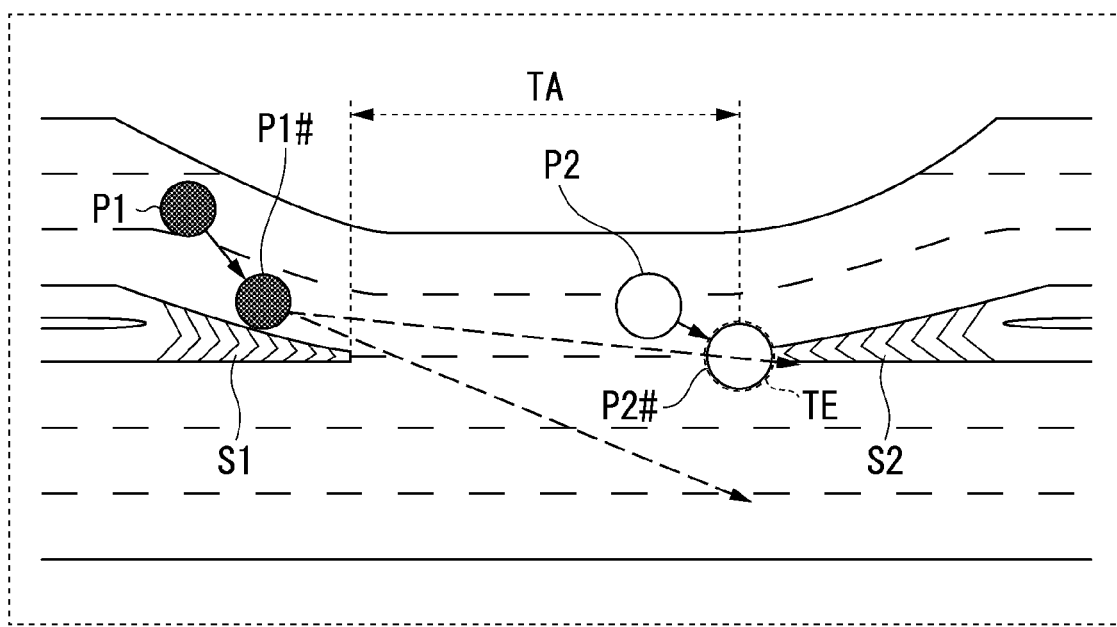
FIG. 11 is a diagram for explaining the content of a process of the present embodiment.

FIG. 10 is a diagram for explaining a process of determining the control mode. As described above, when the vehicle M travels in the lane L3 and faces the direction on the main lane side, the determiner 142 estimates that the end TE of the zebra zone S2 exists in the direction in which the road division line D1 extends. This is because the zebra zone S2 exists between the lane L3 and the lane L4 in the map information (or generally). Then, the determiner 142 determines a steering control mode for changing the orientation of the vehicle M such that the virtual line IL is in a parallel relationship with the road division line D1 (the virtual line IL becomes a virtual line IL #). For example, the determiner 142 rotates the yaw angle of the vehicle M by the angle θ2. The angle θ2 is an angle obtained by subtracting the angle θ1 from 180°.

At this time, the determiner 142 may also determine a speed control mode based on the current speed of the vehicle M and the steering control mode. For example, the determiner 142 determines the speed control mode based on a control map stored in the storage device of the automated driving control device 100 in advance. The control map is a map in which at least an allowable upper limit speed is associated with the direction of the steering and the control amount per the unit time. In the control map, the allowable upper limit speed tends to decrease as the control amount per the unit time of the steering increases. For example, the determiner 142 determines the speed of the vehicle M as a speed equal to or less than the allowable upper limit speed according to the determined steering control mode with reference to the control map. In this way, the vehicle M can change the steering at an appropriate speed based on the steering control mode.

As described above, the automated driving control device 100 can recognize the end TE of the zebra zone S2 by controlling the vehicle M in the steering control mode and the speed control mode determined by the determiner 142.

(Comparison with Comparative Example)

For example, when a camera mounted on a vehicle operates to change an imaging range or a camera capable of capturing a wide field of view is used to expand an imaging range, it is possible to recognize the surroundings of the vehicle. However, the structure of the camera, the function of the camera, and the like are improved as described above, resulting in an increase in the cost. Therefore, it is desirable to more accurately recognize the surroundings of the vehicle while suppressing the cost as much as possible.

In the present embodiment, as described above and as shown in FIG. 11, the automated driving control device 100 recognizes a position P1 #obtained by correcting the position P1 of the vehicle M and the orientation of the vehicle M on the road, on which the vehicle M is traveling, based on the situation around the vehicle M, the first self-position, and the map information. Moreover, the automated driving control device 100 searches for the end TE of the zebra zone S2 by changing the orientation of the vehicle M based on the steering control mode of the vehicle M determined by the determiner 142. In this way, the position of the end TE obtained based on the position P1 is corrected to a highly accurate end TE. Then, the automated driving control device 100 can recognize the target area TA based on the corrected end TE, and can smoothly change lanes in the recognized target area TA.

As described above, the automated driving control device 100 can more accurately recognize the surroundings of the vehicle with a simple configuration, and can smoothly enter the main lane based on the recognition result.

[Flowchart]

Figure 12:
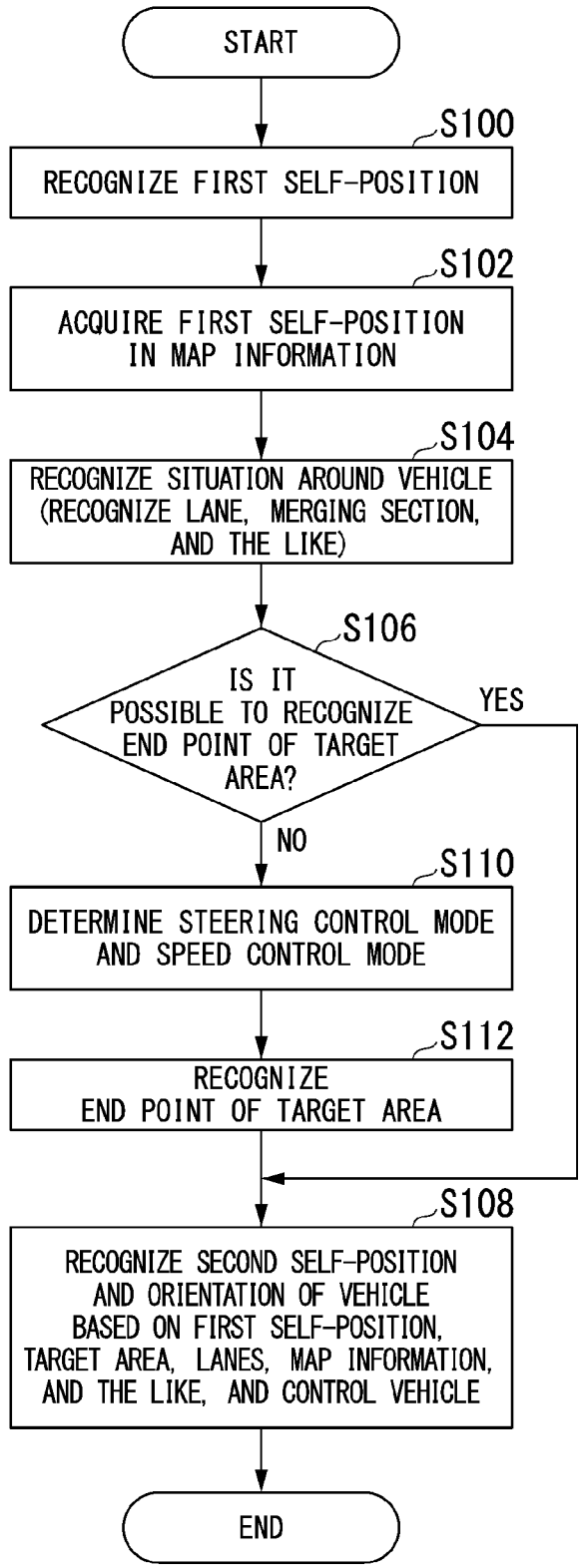
FIG. 12 is a flowchart showing an example of the flow of a process performed by an automated driving control device.

FIG. 12 is a flowchart showing an example of the flow of a process performed by the automated driving control device 100. The present process is a process performed when the vehicle M approaches the target area TA by a predetermined distance.

First, the position acquirer 132 acquires the first self-position (step S100). Next, the position acquirer 132 refers to the map information acquired by the information acquirer 110 and acquires the first self-position in the map information (step S102). Next, the first recognizer 134 recognizes the situation around the vehicle M (for example, lanes, zebra zones, and the like) (step S104).

Next, the first recognizer 134 determines whether it is possible to recognize the end TE of the zebra zone S2 which is the end point of the target area TA (step S106). When it is possible to recognize the end TE of the zebra zone S2 which is the end point of the target area TA, the second recognizer 136 recognizes the second self-position and the orientation of the vehicle M with respect to the road based on the first self-position, the target area TA, the lanes, the map information, and the like (step S108), and controls the vehicle M based on the recognition result.

When it is not possible to recognize the end TE of the zebra zone S2 which is the end point of the target area TA, the determiner 142 determines the steering control mode and the speed control mode (step S110). By controlling the vehicle M based on the control modes in step S110, the first recognizer 134 recognizes the end point of the target area TA (step S112), and proceeds to the process of step S108. In this way, the process of the present flowchart ends.

Note that when the end point of the target area TA is not recognized in the processes of step S110 and step S112, for example, it may be determined that the vehicle M is sufficiently far from the end point of the target area TA. In such a case, after the vehicle M travels a predetermined distance, the process of the present flowchart is performed. For example, when the first self-position is sufficiently far from the target area TA, it may also be determined that the vehicle M is sufficiently far from the end point of the target area TA.

Furthermore, for example, when the first self-position is not sufficiently far from the target area TA, the determiner 142 determines to change the steering control mode more than the steering control mode of the previous process, and controls the vehicle M based on the determined steering control mode and a speed control mode according to the steering control mode. In this way, the orientation of the vehicle M is changed so as to recognize a wider range, so that the first recognizer 134 can recognize the end point of the target area TA by this process.

According to the embodiment described above, in the automated driving control device 100, when the vehicle M advances from the first lane in which the vehicle M travels to the second lane which is the main lane in which the vehicle M is scheduled to advance and the first recognizer has failed to recognize a target associated with a road indicating an end point of a merging section in which merging from the first lane to the second lane is allowed, the determiner 142 determines the steering angle control mode for searching for the target based on the second self-position and the orientation. Then, the automated driving control device 100 can more accurately recognize the surroundings of the vehicle with a simple configuration by controlling the vehicle M based on the control mode determined by the determiner 142.

[Hardware Configuration]

Figure 13:
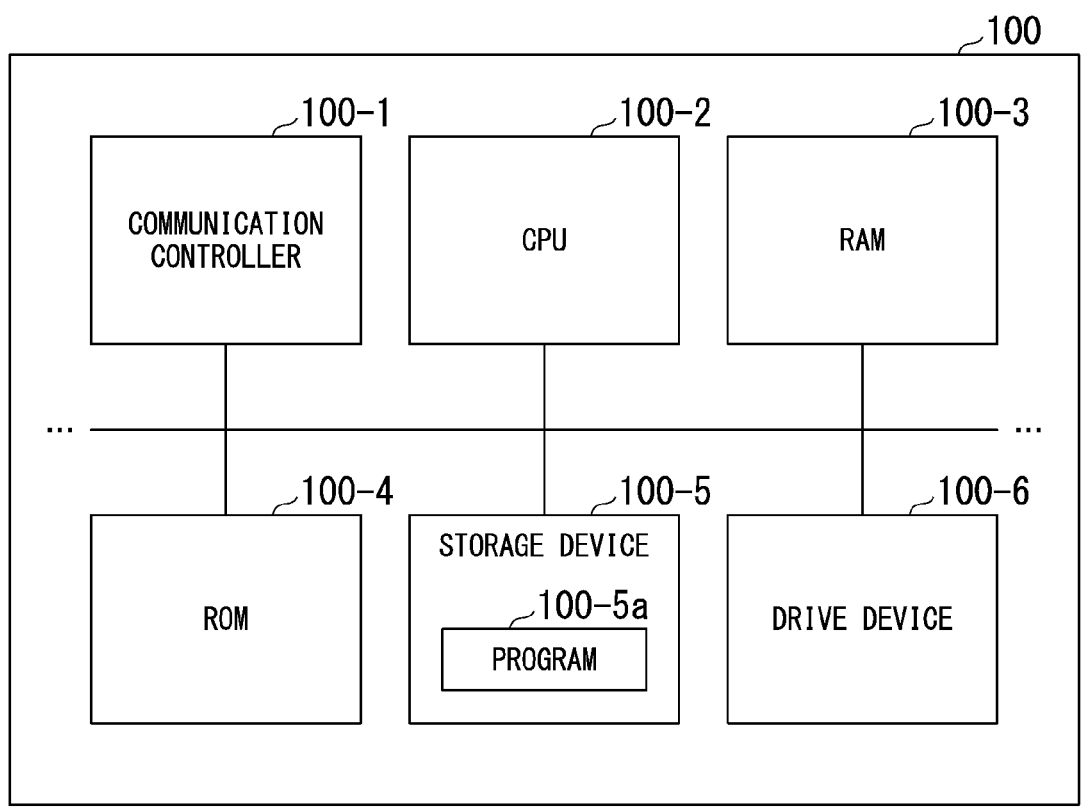
FIG. 13 is a diagram showing an example of a hardware configuration of the automated driving control device of an embodiment.

FIG. 13 is a diagram showing an example of a hardware configuration of the automated driving control device 100 of an embodiment. As shown in FIG. 13, the automated driving control device 100 has a configuration in which a communication controller 100-1, a CPU 100-2, a random access memory (RAM) 100-3 used as a working memory, a read only memory (ROM) 100-4 for storing a boot program and the like, a storage device 100-5 such as a flash memory and a hard disk drive (HDD), a drive device 100-6, and the like are connected to one another by an internal bus or a dedicated communication line. The communication controller 100-1 communicates with components other than the automated driving control device 100. The storage device 100-5 stores a program 100-5a that is executed by the CPU 100-2. The program is loaded on the RAM 100-3 by a direct memory access (DMA) controller (not shown) and the like, and is executed by the CPU 100-2. In this way, some or all of the first controller 120, the second controller 160, and functional units included therein are implemented.

Although a mode for carrying out the present invention has been described using the embodiments, the present invention is not limited to these embodiments and various modifications and substitutions can be made without departing from the spirit of the present invention.

What is claimed is:

1. A vehicle control device comprising:
a storage device configured to store a program; and
a hardware processor,
wherein the hardware processor executes the program stored in the storage device, thereby acquiring a first self-position at which a vehicle is present, recognizing a situation around the vehicle based on information provided by a detection device that detects the situation around the vehicle, recognizing a second self-position, which is obtained by correcting the first self-position, and an orientation of the vehicle on a road, on which the vehicle is traveling, based on the recognized situation around the vehicle, the acquired first self-position, and map information stored in the storage device, determining a steering control mode and a speed control mode of the vehicle based on the recognized second self-position and orientation of the vehicle, and performing automated driving by controlling the vehicle based on the determined control modes, and wherein, when the vehicle is scheduled to advance from a first lane in which the vehicle is travelling to a second lane being a main lane in which the vehicle is scheduled to advance and the hardware processor has failed to recognize a target associated with a road indicating an end point of a merging section in which merging from the first lane to the second lane is allowed, the hardware processor determines a steering angle control mode for searching for the target based on the second self-position and the orientation of the vehicle wherein the steering angle control mode for searching for the target is a control mode in which a reference direction of the vehicle is set to a first direction in which the target is estimated to be present, and the hardware processor estimates the direction, in which the target exists, based on at least the second self-position, the orientation of the vehicle, and the map information, wherein the steering angle control mode for searching for the target is a control mode in which the reference direction of the vehicle is set to the first direction, in which the target is estimated to be present, and is returned to a second direction before being set to the first direction, and wherein the relationship between the reference direction set to the first direction and the direction in which the road division line of the second lane extends is closer to an orthogonal relationship than the relationship between the reference direction set to the second direction and the direction in which the road division line of the second lane extends.

2. The vehicle control device according to claim 1, wherein the first direction is a direction in which a relationship between the reference direction and a direction in which a road division line of the second lane extends is close to a parallel relationship.

3. The vehicle control device according to claim 1, wherein the detection device is an imager that images a stationary range in front of the vehicle.

4. The vehicle control device according to claim 1, wherein the hardware processor acquires the first self-position, at which the vehicle is present, based on a positioning result of a positioning system using a satellite.

5. The vehicle control device according to claim 1, wherein the situation around the vehicle recognized by the hardware processor includes an end of a buffer zone which is a start point of a merging area existing in front of the vehicle and a road division line of the main lane that the vehicle is to enter, and the hardware processor recognizes the second self-position, which is obtained by correcting the first self-position, and the orientation of the vehicle on the road, on which the vehicle is traveling, based on the end of the buffer zone which is the start point of the merging area, the road division line of the main lane that the vehicle is to enter, the self-position acquired by the hardware processor, and the map information.

6. The vehicle control device according to claim 5, wherein the target is an end of the buffer zone which is an end point of the merging area,
the hardware processor recognizes the merging area based on the start point and the end point of the merging area,
the hardware processor determines the steering control mode and the speed control mode of the vehicle based on the merging area, the second self-position, and the orientation of the vehicle, and
the hardware processor performs automated driving based on the determined control mode, thereby controlling the vehicle such that the vehicle enters the main lane in the merging area.

7. A vehicle control method to be executed by a computer, comprising:
acquiring a first self-position at which a vehicle is present;
recognizing a situation around the vehicle based on information provided by a detection device that detects the situation around the vehicle;
recognizing a second self-position, which is obtained by correcting the first self-position, and an orientation of the vehicle on a road, on which the vehicle is traveling, based on the recognized situation around the vehicle, the acquired first self-position, and map information stored in the storage device;
determining a steering control mode and a speed control mode of the vehicle based on the recognized second self-position and orientation of the vehicle;
performing automated driving by controlling the vehicle based on the determined control modes; and
determining, when the vehicle is scheduled to advance from a first lane in which the vehicle is travelling to a second lane being a main lane in which the vehicle is scheduled to advance and it is not possible to recognize a target associated with a road indicating an end point of a merging section in which merging from the first lane to the second lane is allowed, a steering angle control mode for searching for the target based on the second self-position and the orientation of the vehicle,
wherein the steering angle control mode for searching for the target is a control mode in which a reference direction of the vehicle is set to a first direction in which the target is estimated to be present, and the direction, in which the target exists, is estimated based on at least the second self-position, the orientation of the vehicle, and the map information,
wherein the steering angle control mode for searching for the target is a control mode in which the reference direction of the vehicle is set to the first direction, in which the target is estimated to be present, and is returned to a second direction before being set to the first direction, and
wherein the relationship between the reference direction set to the first direction and the direction in which the road division line of the second lane extends is closer to an orthogonal relationship than the relationship between the reference direction set to the second direction and the direction in which the road division line of the second lane extends.

8. A non-transitory computer readable storage medium having stored thereon a program for causing a computer to:
acquire a first self-position at which a vehicle is present;
recognize a situation around the vehicle based on information provided by a detection device that detects the situation around the vehicle;
recognize a second self-position, which is obtained by correcting the first self-position, and an orientation of the vehicle on a road, on which the vehicle is traveling, based on the recognized situation around the vehicle, the acquired first self-position, and map information stored in the storage device;
determine a steering control mode and a speed control mode of the vehicle based on the recognized second self-position and orientation of the vehicle;
perform automated driving by controlling the vehicle based on the determined control modes; and
determine, when the vehicle is scheduled to advance from a first lane in which the vehicle is travelling to a second lane being a main lane in which the vehicle is scheduled to advance and it is not possible to recognize a target associated with a road indicating an end point of a merging section in which merging from the first lane to the second lane is allowed, a steering angle control mode for searching for the target based on the second self-position and the orientation of the vehicle,
wherein the steering angle control mode for searching for the target is a control mode in which a reference direction of the vehicle is set to a first direction in which the target is estimated to be present, and the direction, in which the target exists, is estimated based on at least the second self-position, the orientation of the vehicle, and the map information,
wherein the steering angle control mode for searching for the target is a control mode in which the reference direction of the vehicle is set to the first direction, in which the target is estimated to be present, and is returned to a second direction before being set to the first direction, and
wherein the relationship between the reference direction set to the first direction and the direction in which the road division line of the second lane extends is closer to an orthogonal relationship than the relationship between the reference direction set to the second direction and the direction in which the road division line of the second lane extends.

* * * * *